US009726941B2

(12) United States Patent
Wang et al.

(10) Patent No.: US 9,726,941 B2
(45) Date of Patent: Aug. 8, 2017

(54) PIXEL UNIT, ARRAY SUBSTRATE, DISPLAY DEVICE, AND PIXEL DRIVING METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Zhenwei Wang, Beijing (CN); Yao Yu, Beijing (CN); Lei Tang, Beijing (CN); Xin Li, Beijing (CN); Jian Ren, Beijing (CN); Jing Wang, Beijing (CN); Ying Zhang, Beijing (CN); Yang Pei, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 173 days.

(21) Appl. No.: 14/386,995

(22) PCT Filed: Aug. 2, 2013

(86) PCT No.: PCT/CN2013/080733
§ 371 (c)(1),
(2) Date: Sep. 22, 2014

(87) PCT Pub. No.: WO2014/190611
PCT Pub. Date: Dec. 4, 2014

(65) Prior Publication Data
US 2016/0216565 A1 Jul. 28, 2016

(30) Foreign Application Priority Data

May 28, 2013 (CN) .......................... 2013 1 0204245

(51) Int. Cl.
G09G 3/36 (2006.01)
G02F 1/1343 (2006.01)
(Continued)

(52) U.S. Cl.
CPC ...... *G02F 1/134309* (2013.01); *G02F 1/1362* (2013.01); *G02F 1/13439* (2013.01);
(Continued)

(58) Field of Classification Search
None
See application file for complete search history.

(56) References Cited

U.S. PATENT DOCUMENTS

2008/0143910 A1 6/2008 Cheng
2008/0204613 A1* 8/2008 Kim .................. G02F 1/133707
349/33

(Continued)

FOREIGN PATENT DOCUMENTS

CN 1949524 A 4/2007
CN 10149368 A 4/2009
(Continued)

OTHER PUBLICATIONS

International Preliminary Report on Patentability Appln, No. PCT/CN2013/080733; Dated Dec. 1, 2015.
(Continued)

*Primary Examiner* — Joseph Haley
(74) *Attorney, Agent, or Firm* — Ladas & Parry LLP

(57) ABSTRACT

A pixel unit, including: a pixel electrode, a gate electrode, a gate electrode line connected with the gate electrode, a source electrode, a data line connected with the source electrode, a second electrode disposed in a same layer as the pixel electrode, a first drain electrode connected with the pixel electrode, and a second drain electrode connected with the second electrode; the first drain electrode and the second
(Continued)

drain electrode and the source electrode are provided with a channel therebetween, and the first drain electrode and the second drain electrode do not contact each other; along a direction of the data line, the edge of the second electrode is parallel with the edge of the pixel electrode and the two do not contact. An array substrate, a pixel driving method and a display device are further disclosed for overcoming the phenomenon of light leakage of the edge of the pixel unit caused by reduction of the width of the black matrix.

15 Claims, 3 Drawing Sheets

(51) Int. Cl.
*G02F 1/1362* (2006.01)
*G02F 1/136* (2006.01)

(52) U.S. Cl.
CPC ..... *G02F 1/136286* (2013.01); *G09G 3/3688* (2013.01); *G02F 2001/13606* (2013.01); *G02F 2001/136218* (2013.01); *G09G 2300/0426* (2013.01); *G09G 2310/0251* (2013.01)

(56) References Cited

U.S. PATENT DOCUMENTS

| | | |
|---|---|---|
| 2009/0026451 A1 | 1/2009 | Shin et al. |
| 2009/0103035 A1 | 4/2009 | Suzuki et al. |
| 2011/0096278 A1 | 4/2011 | Kim et al. |
| 2011/0222004 A1* | 9/2011 | Kim ............... G02F 1/1393 349/106 |
| 2015/0036067 A1* | 2/2015 | Xue ............... G09G 3/003 349/15 |

FOREIGN PATENT DOCUMENTS

| | | |
|---|---|---|
| CN | 102053426 A | 5/2011 |
| TW | 200825594 A | 6/2008 |

OTHER PUBLICATIONS

International Search Report Appln. No. PCT/CN2013/080733; Dated Feb. 27, 2014.
First Chinese Office Action dated Aug. 2, 2016; Appl. No. 201310204245.1.

* cited by examiner

PIXEL UNIT, ARRAY SUBSTRATE, DISPLAY DEVICE, AND PIXEL DRIVING METHOD

TECHNICAL FIELD

Embodiments of the present invention relate to a pixel unit, an array substrate, a display device, and a pixel driving method.

BACKGROUND

A planar structure of a pixel unit of an array substrate is illustrated in FIG. 1, and FIG. 1 shows two adjacent pixel units. Each pixel unit comprises a pixel electrode 1, a gate electrode 2, a gate electrode line 7 connected with the gate electrode 2, a source electrode 3, a data line 6 connected with the source electrode 3, and a drain electrode 4 connected with the pixel electrode 1. After powered on, the data line 7 charges the pixel electrode 1 via the drain electrode 4 of a thin film transistor, liquid crystal molecules 5 undergo deflection under the action of an electric field; at this time, a sectional view of the edge of the pixel unit is illustrated in FIGS. 2 and 3. FIGS. 2 and 3 only illustrate a black matrix on an opposed substrate (for example, a color filter substrate) opposite to the array substrate. In order to increase the transmission ratio of a liquid crystal display panel, the width of the black matrix 11 on the color filter substrate can be reduced. Combined with FIGS. 1 to 3, FIG. 2 is a sectional view of the left side edge of the pixel unit along A-A' illustrated in FIG. 1, and FIG. 3 is a sectional view of the right side edge of the pixel unit along A-A' illustrated in FIG. 1. As illustrated in FIGS. 2 and 3, if the width of the black matrix 11 is reduced, because the fringing electric field lines at the edge of the pixel unit are not uniform and generate bend, the orientations of liquid crystal molecules distributed at the edge of the pixel unit are not in accordance with the orientations of the liquid crystal molecules of the middle portion of the pixel unit, and there occurs irregular arrangement, which leads to light leakage at the edge of the pixel unit and affects the display effect. Therefore, in order to prevent the light leakage, as illustrated in FIGS. 2 and 3, the edge of the black matrix 11 slightly covers the edge of the pixel electrode 1 in a vertical direction, i.e., the two are partially overlapped in the vertical direction.

Here, the light leakage phenomenon occurs at a long edge side of the pixel unit, i.e., the left or right side of the pixel unit illustrated in FIG. 1; it is because the liquid crystal molecules 5 are arranged along the long edges of the pixel unit; when viewed from the left and right directions of the pixel unit, the liquid crystal molecules 5 have smaller birefringence in the directions, so it is easy for leak light to occur. However, when viewed from the up and down directions of the pixel unit (as illustrated in FIG. 1), the liquid crystal molecules have bigger birefringence in the directions, so it is not easy for leak light to occur.

SUMMARY

Embodiments of the present invention provide a pixel unit, an array substrate, a display device, and a pixel driving method, which can overcome the existing phenomenon of light leakage at an edge of a pixel unit caused by reduction of the width of a black matrix.

One aspect of the present invention provides a pixel unit, comprising: a pixel electrode, a gate electrode, a gate electrode line connected with the gate electrode, a source electrode, a data line connected with the source electrode, a second electrode disposed in a same layer as the pixel electrode, a first drain electrode connected with the pixel electrode, and a second drain electrode connected with the second electrode; the first drain electrode and the second drain electrode, and the source electrode are provided with a channel therebetween, and the first drain electrode does not contact the second drain electrode; along the direction of the data line, the edge of the second electrode is parallel to the edge of the pixel electrode and do not contact the edge of the pixel electrode.

For example, the second electrode may be disposed at a side of the pixel unit, at which side the data line is provided.

For example, the second electrode may have a same thickness as the pixel electrode.

For example, the second electrode may comprise a same material as the pixel electrode.

For example, the second electrode may have an interval which is no less than 2 µm with the pixel electrode.

For example, the second electrode may have an interval which is bigger than or equal to 2.5 µm with the pixel electrodes of the adjacent pixel units.

For example, a pattern area of the second drain electrode may be less than or equal to the pattern area of the first drain electrode.

Another aspect of the present invention provides an array substrate, and the array substrate comprises the pixel unit of any one above-mentioned.

Yet another aspect of the present invention provides a pixel driving method, which is applied to the above array substrate; when a voltage is applied to conduct the channel via the gate electrode, charging the pixel electrode via the first drain electrode, and charging the second electrode via the second drain electrode.

Yet another aspect of the present invention provides a display device, and the display device comprises the above array substrate.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DRAWING REFERENCE NUMBERS

1—pixel electrode; 2—gate electrode; 3—source electrode; 5—liquid crystal molecule; 6—data line; 7—gate electrode line; 8—second electrode; 9—first drain electrode; 10—second drain electrode; 11—black matrix.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

In an embodiment of the present invention, disposing a second electrode at a same layer as the pixel electrode in the pixel unit, and disposing a first drain electrode connected with the pixel electrode and a second drain electrode connected with the second electrode; the second electrode is disposed at a same layer as the pixel electrode; the first drain electrode and the second drain electrode, and the source electrode are provided with a channel therebetween, and the first drain electrode and the second drain electrode do not contact each other; along the direction of the data line, the edge of the second electrode is parallel to the edge of the pixel electrode, and the two do not contact each other.

In an embodiment of the present invention, the array substrate of a display device comprises a plurality of gate lines and a plurality of data lines, these gate lines and the data lines cross each other so as to define pixel units arranged in an array, each pixel unit comprises a thin film transistor as a switching element and a pixel electrode used to control the arrangement of the liquid crystal. For example, the gate electrode of the thin film transistor of each pixel and the corresponding gate line are electrically connected or integrated, the source electrode and the corresponding date line are electrically connected or integrated, and the drain electrode and the corresponding pixel electrode are electrically connected or integrated. The following description mainly are related to a single or plurality pixel units, but the other pixel units may be formed in the same way. The array substrate and the opposed substrate cooperate in use, the opposed substrate is provided with a black matrix corresponding to the pixel units; the black matrix, for example, is disposed around corresponding pixel units and forms opening regions exposing the pixel electrodes of the pixel units for displaying.

Figure 1:
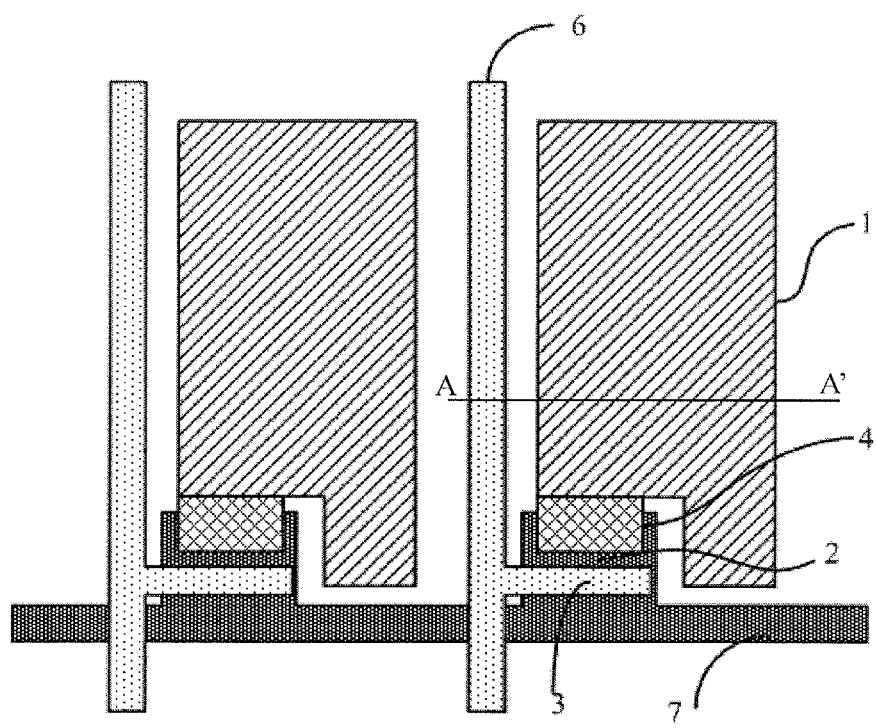
FIG. 1 is a planar structural schematic diagram of a pixel unit.
Figure 2:
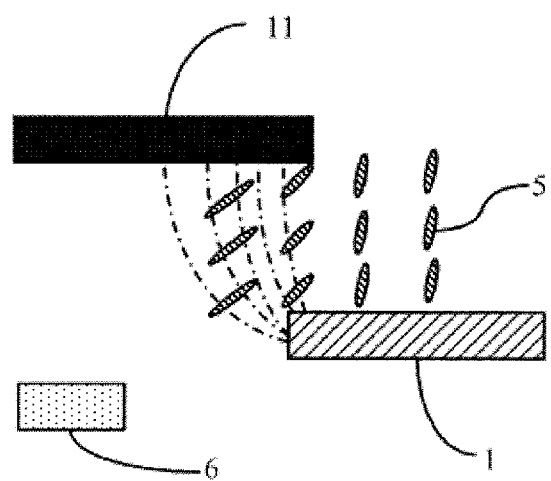
FIG. 2 is a sectional view of the left side edge of the pixel unit as illustrated in FIG. 1.
Figure 3:
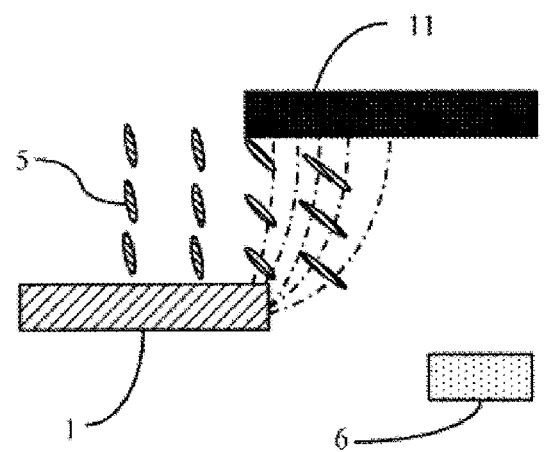
FIG. 3 is a sectional view of the right side edge of the pixel unit as illustrated in FIG. 2.
Figure 4:
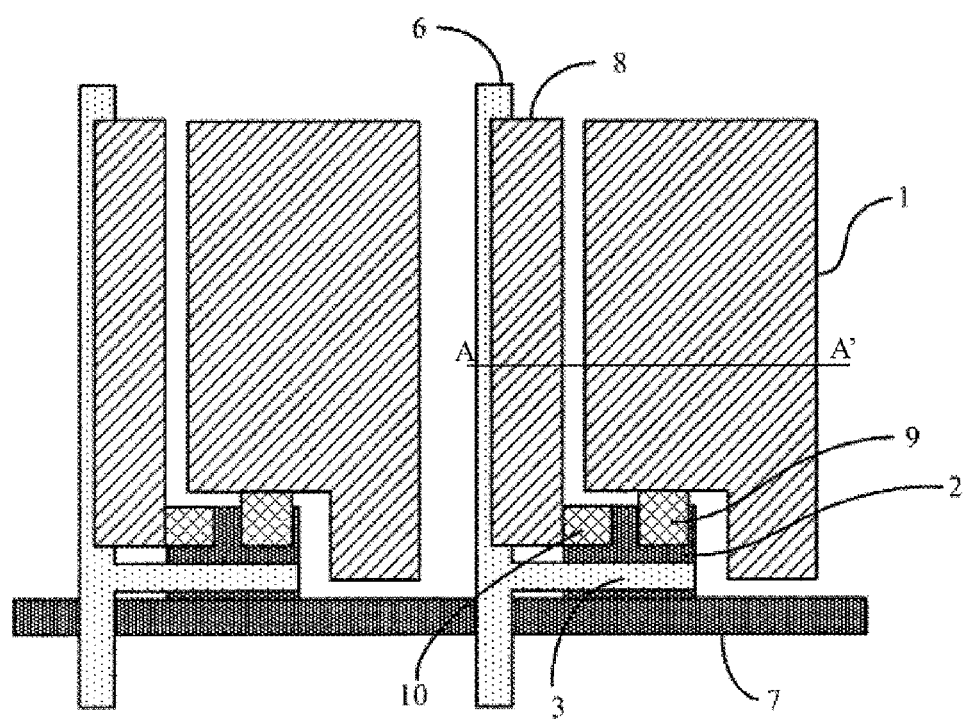
FIG. 4 is a planar structural schematic diagram of a pixel unit as described by an embodiment of the present invention.

FIG. 4 is a planar structural schematic diagram of a pixel unit of an array substrate of one embodiment of the present invention. FIG. 4 illustrates two pixel units for the purpose of description, and each pixel unit comprises a pixel electrode 1, a gate electrode 2, a gate electrode line 7 connected with the gate electrode 2, a source electrode 3, and a data line 6 connected with the source electrode 3. The pixel unit further comprises a second electrode 8 disposed in a same layer as the pixel electrode 1, a first drain electrode 9 connected with the pixel electrode 1, and a second drain electrode 10 connected with the second electrode 8. In an example, the source electrode 3 and the drain electrodes 9 and 10 may be provided (covered) with a passivation layer (not shown) thereon, the passivation layer is provided with two via holes (not shown) therein, the pixel electrode 1 is electrically connected with the first drain electrode 9 through one via hole, and the second electrode 8 is electrically connected with the second drain electrode 10 through the other via hole. In the planar direction (i.e., the paper surface direction), a channel portion of the active layer of the thin film transistor is located between the source electrode 3, and the first drain electrode 9 and the second drain electrode 10; the first drain electrode 9 and the second drain electrode 10 do not contact each other so as to reduce the mutual interference therebetween. Because the data signals on the second drain electrode and the data line have a big crosstalk therebetween, if the two drain electrodes are connected with each other, the signals of the pixel electrode will be affected. Along the direction of the data line 6, the edge of the second electrode 8 is parallel with the edge of the pixel electrode 1, and the two do not contact each other. When a turn-on (ON) signal is applied to the gate electrode 2, the channel portion of the active layer between the source electrode 3, and the first drain electrode 9 and the second drain electrode 10 becomes conductive, so that the data on the data line 6 can be transferred into the pixel electrode 1 and the second electrode 8 via the source electrode 3, the channel portion, the first drain electrode 9 and the second drain electrode 10.

Here, for example, the length of the second electrode may be equal to the length of the pixel electrode 1; or the length of the second electrode 8 may be not equal to the length of the pixel electrode 1, which is not limited herein. The length of the second electrode 8 or the pixel electrode 1 is the length, in the direction parallel to the data line 6, of the second electrode 8 or the pixel electrode 1.

For example, the second electrode 8 may be disposed at the side of the pixel unit, at which side the data line 6 is provided.

For example, the thickness of the second electrode 8 may be the same as the thickness of the pixel electrode 1; the second electrode 8 may comprise the same material as the pixel electrode 1, for example, a transparent conductive material, such as indium tin oxide (ITO) or indium zinc oxide (IZO).

Figure 5:
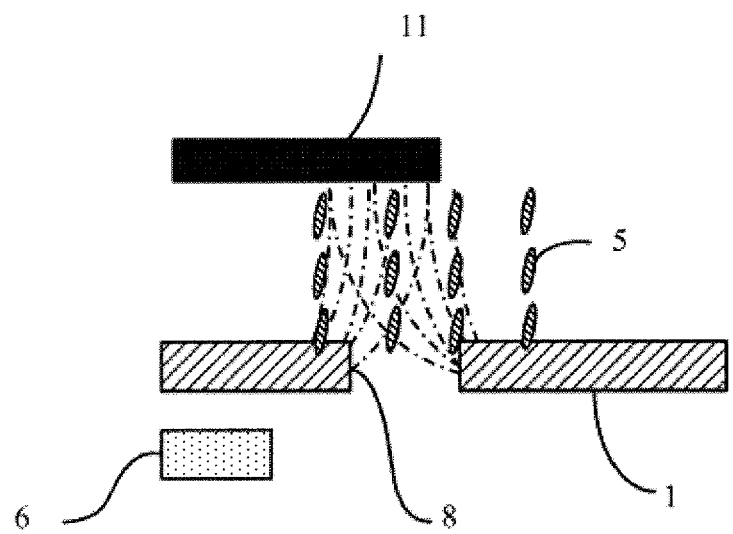
FIG. 5 is a sectional view of the left side edge of the pixel unit as illustrated in FIG. 4.

FIG. 5 is a sectional view of the left side edge of the pixel unit along A-A' illustrated in FIG. 4. Combined with FIG. 4 and FIG. 5, the second electrode 8 is disposed in the same layer as the pixel electrode 1, at least partially overlaps with the adjacent data line 6 in the vertical direction as illustrated by the arrow and with the black matrix 11 on the opposed substrate in the vertical direction as well. Scanning signals are applied to the gate line 7 for display; when a voltage is applied via the gate electrode 2 so as to render the channel of the thin film transistor conductive, the pixel electrode 1 is charged via the first drain electrode 9, and the second electrode 8 is charged via the second drain electrode 10. In FIG. 5, because the pixel electrode 1 is disposed in the same layer as the second electrode 8, the fringing electric fields of the pixel electrode 1 and the second electrode 8 superimpose each other to form the same regular electric field lines as the middle portion of the pixel electrode 1, the liquid crystal molecules 5 at the edge position of the pixel electrode 1 can be arranged regularly under the action of the formed electric field, which have the same orientations as the liquid crystal molecules 5 at the middle portion of the pixel unit. In this way, the black matrix 11 disposed on the color filter substrate may be disposed with a smaller width. As illustrated in FIG. 5, the edge of the black matrix 11 may not overlap the edge of the pixel electrode 1 in the vertical direction, so that the phenomenon of light leakage of the edge of the pixel unit which is caused by reduction of the width of the black matrix can be overcome.

In the procedure of manufacturing the above array substrate, possibly because the limit of the exposure ability of an exposure device, the interval between the second electrode 8 and the pixel electrode 1 is no less than 2 µm, and if the interval becomes smaller, the two electrodes may trend to connect with each other. Furthermore, by considering the problem of crosstalk, the interval between the second electrode 8 and the pixel electrode 1 of the adjacent pixel unit is no less than 2.5 µm.

For example, as illustrated by FIG. 4, in order not to affect the aperture ratio of the pixel unit, the first drain electrode 9 and the second drain electrode 10 are provided to be small. The pattern area of the first drain electrode 9 may be smaller than the pattern area of the drain electrode of the TFT in an existing pixel unit. The pattern area of the second drain electrode 10 may be comparable or less than the pattern area of the first drain electrode 9, this is because the charging time required by the second electrode 8 is less than the charging time required by the pixel electrode 1.

An embodiment of the present invention further provides an array substrate; the array substrate comprises pixel units described above, and the array substrate comprises a pixel array formed by rows and columns of pixel units.

An embodiment of the present invention further provides a pixel driving method, which is applied to the array substrate described above; when a voltage is applied to conduct the channel via the gate electrode of the thin film transistor of the pixel unit, the pixel electrode is charged via the first drain electrode, the second electrode is charged via the second drain electrode, and the pixel electrode and the second electrode are connected to the same voltages, i.e., the pixel electrode and the second electrode are applied with the same voltages.

Figure 6:
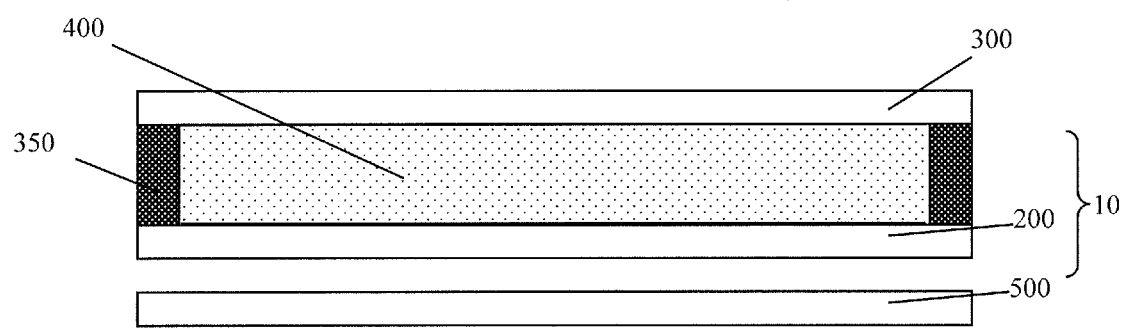
FIG. 6 is a schematic diagram of a display device of an embodiment of the present invention.

An embodiment of the present invention provides a display device, and the display device comprises the array substrate described above. An example of the display device is a liquid crystal display device, as illustrated in FIG. 6. In a display device 10, an array substrate 200 and an opposed substrate 300 are disposed opposite to each other and form a liquid crystal cell by a sealant 350, and a liquid crystal material 400 is filled in the liquid crystal cell. The opposed substrate 300 is a color filter substrate for example. The pixel electrode of each pixel unit of the array substrate 200 is used to apply a voltage to control the rotated degree of the liquid crystal material so as to perform display operations. In some examples, the liquid crystal display device 10 further comprises a backlight source 500 for providing backlight to the array substrate 200.

The liquid crystal display device may he of various modes, such as twist nematic (NT) mode, vertical alignment (VA) mode, In-plane switching (IPS) mode, and fringing field switching (FFS) mode, and the present invention is not limited to a specific mode. According to the different display device modes, the common electrode cooperating with the pixel electrode to generate an electric filed to drive the liquid crystal may be formed on the array substrate or on the opposed substrate.

Embodiments of the present invention provide a pixel unit, an array substrate, a display device, and a pixel driving method; in the pixel unit, charging the pixel electrode via the first drain electrode, and charging the second electrode via the second drain electrode, because the pixel electrode and the second electrode are connected with the same voltages, the fringing electric fields of the pixel electrode and the second electrode superimpose each other to form the same regular electric field lines as the middle portion of the pixel electrode, the liquid crystal molecules at the edge position of the pixel electrode can be arranged regularly under the action of the formed electric field, which have the same orientations as the liquid crystal molecules at the middle portion of the pixel unit, so that the phenomenon of light leakage at the edge of the pixel unit caused by reduction of the width of the black matrix can be overcome.

The above embodiments of the present invention are given by way of illustration only and thus are not limitative of the protection scope of the present invention, which is determined by the attached claims.

The invention claimed is:

1. A pixel unit, comprising: a pixel electrode, a gate electrode, a gate electrode line connected with the gate electrode, a source electrode, a data line connected with the source electrode, a second electrode disposed in a same layer as the pixel electrode, a first drain electrode connected with the pixel electrode, and a second drain electrode connected with the second electrode, wherein the second electrode is at least partially overlapped with the adjacent data line in a vertical direction and the second electrode is at least partially overlapped with a black matrix, which is on an opposing substrate, in the vertical direction;

wherein the first drain electrode and the second drain electrode, and the source electrode are provided with a channel therebetween, and the first drain electrode and the second drain electrode does not contact each other;

wherein, along a direction of the data line, an edge of the second electrode is parallel with an edge of the pixel electrode and do not contact the edge of the pixel electrode.

2. The pixel unit according to claim 1, wherein the second electrode is disposed at a side of the pixel unit, at which side the data line is provided.

3. The pixel unit according to claim 1, wherein a thickness of the second electrode is same as a thickness of the pixel electrode.

4. The pixel unit according to claim 1, wherein the second electrode comprises a same material as the pixel electrode.

5. The pixel unit according to claim 1, wherein an interval between the second electrode and the pixel electrode is no less than 2 μm.

6. The pixel unit according to claim 1, wherein an interval between the second electrode and the pixel electrode of an adjacent pixel unit is bigger than or equal to 2.5 μm.

7. The pixel unit according to claim 1, wherein a pattern area of the second drain electrode is less than or equal to a pattern area of the first drain electrode.

8. An array substrate, comprising the pixel unit as claimed by claim 1.

9. A pixel driving method, used for the array substrate as claimed by claim 8, comprising: when a voltage is applied to conduct the channel via the gate electrode, charging the pixel electrode via the first drain electrode, and charging the second electrode via the second drain electrode.

10. A display device, comprising the array substrate as claimed by claim 8.

11. The pixel unit according to claim 2, wherein a thickness of the second electrode is same as a thickness of the pixel electrode.

12. The pixel unit according to claim 2, wherein the second electrode comprises a same material as the pixel electrode.

13. The pixel unit according to claim 2, wherein an interval between the second electrode and the pixel electrode is no less than 2 μm.

14. The pixel unit according to claim 2, wherein an interval between the second electrode and the pixel electrode of an adjacent pixel unit is bigger than or equal to 2.5 μm.

15. The pixel unit according to claim 2, wherein a pattern area of the second drain electrode is less than or equal to a pattern area of the first drain electrode.

* * * * *